United States Patent
Oh

(10) Patent No.: US 7,490,181 B2
(45) Date of Patent: Feb. 10, 2009

(54) DATA REPRODUCING APPARATUS FOR TRANSFORMING EXTERNAL INPUT SIGNAL AND METHOD THEREOF

(75) Inventor: Sung-bo Oh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 393 days.

(21) Appl. No.: 11/156,666

(22) Filed: Jun. 21, 2005

(65) Prior Publication Data

US 2005/0283551 A1 Dec. 22, 2005

(30) Foreign Application Priority Data

Jun. 22, 2004 (KR) .................... 10-2004-0046395

(51) Int. Cl.
*G06F 13/12* (2006.01)
*H04N 7/16* (2006.01)

(52) U.S. Cl. ............................ 710/65; 710/66; 710/69; 710/70; 725/135

(58) Field of Classification Search ....................... None
See application file for complete search history.

(56) References Cited

U.S. PATENT DOCUMENTS

| | | | | |
|---|---|---|---|---|
| 6,798,458 | B1 * | 9/2004 | Unemura | 348/448 |
| 7,027,981 | B2 * | 4/2006 | Bizjak | 704/225 |
| 7,155,544 | B2 * | 12/2006 | Im | 710/67 |
| 2005/0160468 | A1 * | 7/2005 | Rodriguez et al. | 725/109 |
| 2006/0229752 | A1 * | 10/2006 | Chung | 700/94 |
| 2007/0157260 | A1 * | 7/2007 | Walker | 725/86 |

FOREIGN PATENT DOCUMENTS

| | | |
|---|---|---|
| CN | 1123497 | 5/1996 |
| CN | 1160325 | 9/1997 |
| KR | 10-0385993 | 12/2002 |
| KR | 2003-0008239 | 1/2003 |

OTHER PUBLICATIONS

Chinese Patent Office Action, mailed Jan. 25, 2008 and issued in corresponding Chinese Patent Application No. 200510079405.X.

* cited by examiner

*Primary Examiner*—Alan Chen
(74) *Attorney, Agent, or Firm*—Staas & Halsey LLP

(57) ABSTRACT

A DVD reproducing device is capable of being connected to a certain external electronic device. The DVD reproducing device includes an external input receiving unit connected with the external electronic device to receive an external input signal from the external electronic device. A key input receiving unit receives a user selection signal for selecting whether or not the external input signal is transformed. An external signal processing unit transforms the external input signal into a certain form according to a user selection signal. A control unit controls the external signal processing unit such that when an external input signal is received through the external input receiving unit, a received signal is transformed into a signal form predetermined by a user selection signal; and a signal output unit outputs the external input signal transformed at the external signal processing unit, whereby a signal inputted from the external electronic device is transformed into an optimal form to be displayed on the video display device.

11 Claims, 3 Drawing Sheets

DATA REPRODUCING APPARATUS FOR TRANSFORMING EXTERNAL INPUT SIGNAL AND METHOD THEREOF

CROSS-REFERENCE TO RELATED APPLICATION

This application claims benefit under 35 U.S.C. § 119 from Korean Patent Application No. 2004-46395, filed on Jun. 22, 2004, the entire content of which is incorporated herein by reference.

BACKGROUND OF THE INVENTION

1. Field of the Invention

The present invention relates to a data reproducing apparatus and a method thereof, which reproduces data from a DVD to transfer reproduced data to a video display appliance, and more particularly to a DVD reproducing device and a method thereof, in which when an external input signal is received from an external electronic device connected thereto, the received signal is transformed into a certain predetermined signal form to be transferred to a video display appliance.

2. Description of the Related Art

Generally, with the development of electronic technology, many users have used a television (TV) and a data recording/reproducing device such as a video cassette recorder (VCR) and a digital versatile disk (DVD) player, which can be used to be connected to a TV. The data recording/reproducing device reproduces data from the recording media such as a magnetic tape or a DVD and outputs reproduced data through a TV screen so as to watch TV.

FIG. 1 is a schematic diagram showing a system including a DVD player and a TV connected to each other. Referring to FIG. 1, the DVD player 10 and the TV 30 are connected to each other by a connector 20 and a cable 21. The DVD player 10 transfers data reproduced from the DVD to the TV 30 through the connector 20 and the cable 21. The TV 30 therefore outputs received data on the screen.

Meanwhile, a digital interface such as a digital visual interface (DVI) and a high definition multimedia interface (HDMI), is recently used for the connection between the DVD player 10 and the TV 30. DVI is a digital interface standard proposed by Digital Display Working Group (DDWG), which interface is provided for transferring a digital signal rather than an analog signal from a transmitter such as a personal computer (PC) and the like to a display device such as monitor. HDMI is a next-generation interface that transfers digital audio and video signals through a single cable without compressing the signals.

As the digital interface has been developed and used, the DVD player 10 can directly transfer reproduced digital data to the TV 30 without transforming the same into analog signal form, outputting high resolution digital video.

Meanwhile, recently, as various kinds of electronic instruments such as camcorders and digital cameras have become popular, people have enjoyed watching reproduced video images shot by such imaging devices through a TV screen. In the case of an analog camcorder, the TV 30 cannot display the image properly even if it supports a high resolution output function, so that it has no choice but to reproduce the image with relatively low resolution. Particularly, since country signal formats (such as NTSC, PAL, SECAM and so on) are different from each other, it may cause a problem in that in case of the camcorder that records data in a different format, images cannot be normally reproduced. However, since a conventional DVD player 10 can only conduct reproducing or recording of the DVD title, it cannot be used to resolve the problem.

SUMMARY OF THE INVENTION

Accordingly, in one aspect, the present invention has been made to solve the above-mentioned problem occurring in the prior art, and an object of the present invention is to provide a DVD reproducing device and a method thereof in which when an external input signal is received from a connected external electronic device, the received signal is transformed into a predetermined signal form to be transferred to a video display appliance.

According to an aspect of the present invention, there is provided a DVD reproducing device including an external input receiving unit connected with an external electronic device to receive an external input signal from the external electronic device; a key input receiving unit to receive a user selection signal to select whether the external input signal is transformed; an external signal processing unit for transforming external input signal into a predetermined form; a control unit to control the external signal processing unit such that when an external input signal is received, the received signal is transformed into a predetermined signal form by a user selection signal; and a signal output unit to output the external input signal transformed by the control of the control unit.

In one aspect, the DVD reproducing device may further comprise a data reproducing module to reproduce data recorded in a DVD. The signal output unit selectively outputs any one of the external input signals transformed at the external signal processing unit and the data reproduced at the data reproducing module.

Meanwhile, the DVD reproducing device may further include an analog interface to transfer an analog signal outputted from the signal output unit to an external video display device; and a digital interface to transfer a digital signal outputted from the signal output unit to an external video display device.

According to an aspect of the present invention, the external signal processing unit may include an A/D converter to convert an analog signal received in the external input receiving unit into a digital signal, a scaler to transform resolution of an external input signal, and a broadcasting format transforming unit to transform a signal format of an external input signal.

In one aspect, the control unit may control at least one of the A/D converter, the scaler and the broadcasting format transforming unit so as to transform external input signal in response to a user selection signal.

Meanwhile, in accordance with another aspect of the present invention, there is provided a method for data transfer in a DVD reproducing device, the method including: receiving a certain external input signal; receiving a user selection signal which selects whether the external input signal is transformed; transforming the external input signal into a signal form selected by the user selection signal; and selectively transferring one of the data reproduced from a DVD and the transformed external input signal.

According to an aspect of the present invention, the transferring application may include: transferring a certain analog signal to an external video display device using an analog interface, and transferring a certain digital signal to the external video display device a DVI interface or a HDMI interface.

The transferring operation may include: transforming the external input signal into a digital signal when the external input signal has an analog signal form, transforming resolution of the external input signal according to a selected state of the user selection signal, and transforming a signal format of the external input signal according to a selected state of the user selection signal.

Additional aspects and/or advantages of the invention will be set forth in part in the description which follows and, in part, will be apparent from the description, or may be learned by practice of the invention.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Hereinafter, embodiments of the present invention will be described in detail with reference to accompanying drawings. It should be understood, however, that these embodiments are given for illustrative purpose only and are not intended to limit the scope of the present invention.

Figure 1:
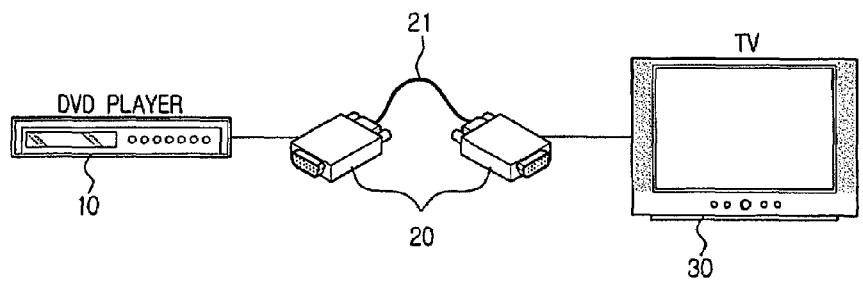
FIG. 1 is a schematic diagram showing a DVD reproducing device connected with a video display device.
Figure 2:
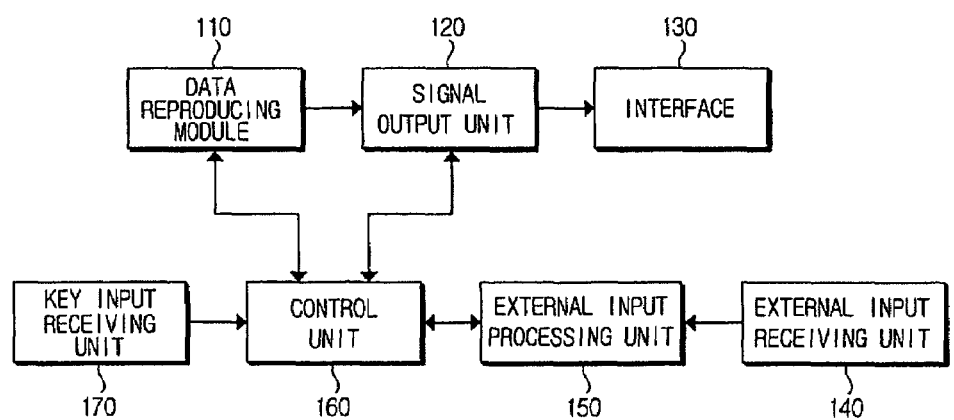
FIG. 2 is a block diagram showing a construction of a DVD reproducing device according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures, FIG. 2 is a block diagram showing a construction of a DVD reproducing device according to an embodiment of the present invention. Referring to FIG. 2, the DVD reproducing device includes a data reproducing module 110, a signal output unit 120, an interface 130, an external input receiving unit 140, an external input processing unit 150, a control unit 160, and a key input receiving unit 170.

The data reproducing module 110 serves to reproduce data from a DVD. Reproduced data is outputted to an external video display device by the signal output unit 120. In this case, the signal output unit 120 uses an interface 130 connected to the external video display device.

Meanwhile, the DVD reproducing device includes the external input receiving unit 140 connected with a separate external electronic device to receive an external input signal. The external electronic device may be a camcorder, a digital camera, a memory card or the like, and the external input signal may be an analog moving picture signal, a still image signal or the like.

The external input signal received by the external input receiving unit 140 is transformed into a type of signal based on a user selection state of the external input processing unit 150. In other words, the resolution of external the input signal is transformed, or an NTSC broadcasting format is transformed into a PAL broadcasting format.

A user may alter the transform setting for the external input signal using the key input receiving unit 170. That is, when a user manipulates buttons and so on provided on a body of the DVD reproducing device or a remote controller to input a user selection signal, the key input receiving unit 170 receives the user selection signal and transfers it to the control unit 160.

The control unit 160 controls the external input processing unit 150 such that external input signal is transformed corresponding to a selected state of the received user selection signal. The transformed external input signal may be transferred to an external video display device by the signal output unit 120. In this case, the control unit 160 controls the signal output unit 120 such that data selected by a user through the key input receiving unit 170 among data reproduced by the data reproducing module 110 and data transformed by the external input processing unit 150, is transferred to the external video display device.

Figure 3:
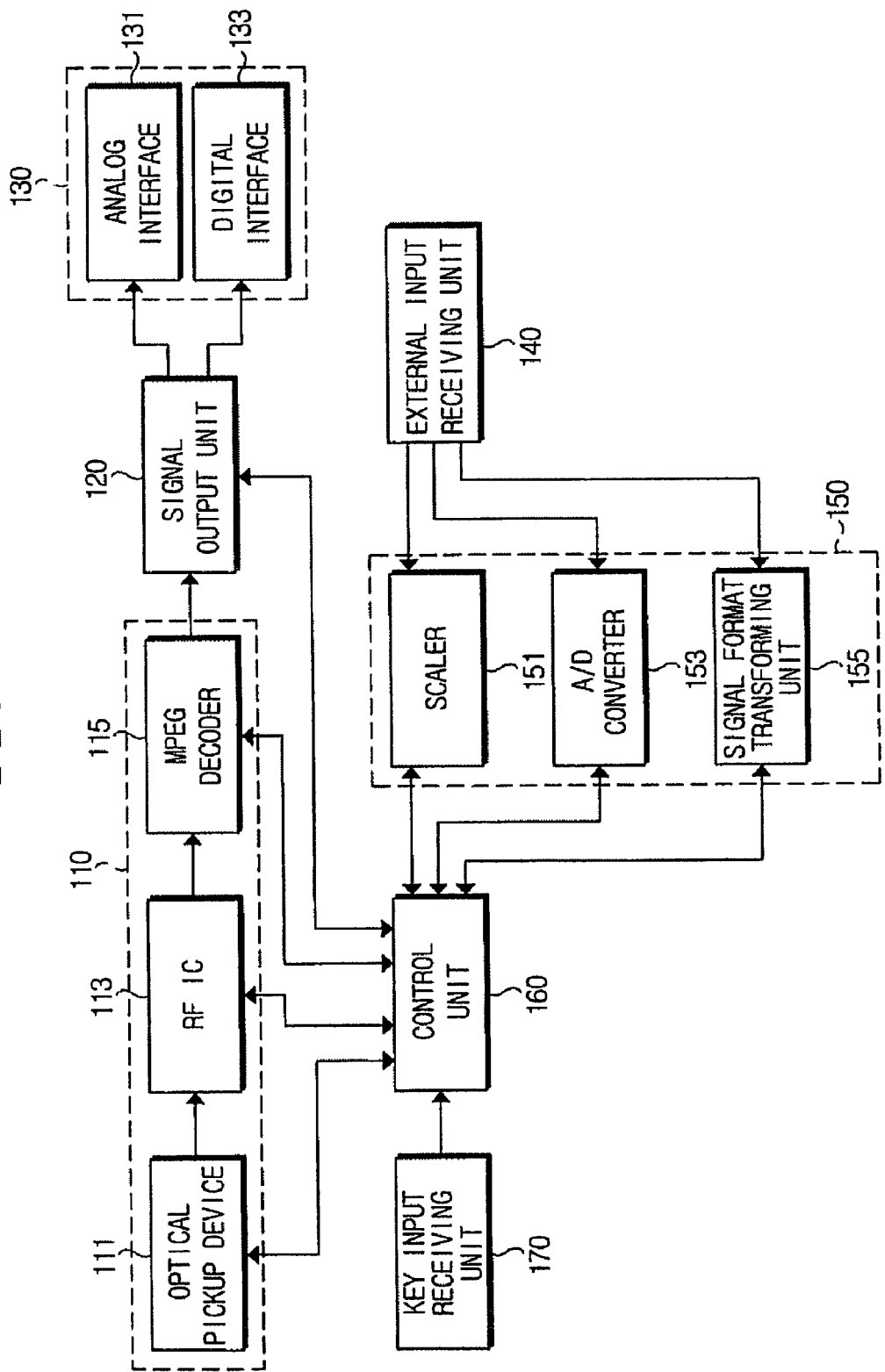
FIG. 3 is a block diagram showing a detailed construction of the DVD reproducing device of FIG. 2.

FIG. 3 is a block diagram showing a detailed construction of the DVD reproducing device of FIG. 2. Referring to FIG. 3, the data reproducing module 110 includes an optical pickup device 111, radio frequency integrated circuit (RF IC) 113 and a moving picture experts group (MPEG) decoder 115. The optical pickup device 111 serves to irradiate light on a DVD and to pickup reflected light from a surface of the DVD. The RF IC 113 detects an intensity change of the reflected light picked-up by the optical pickup device 111 so as to generate a digital signal corresponding to data recorded on the DVD. The MPEG decoder 115 receives a generated digital signal and decodes it into video data and audio data. The signal output unit 120 accordingly transfers reproduced video and audio data to the video display device through the interface 130.

Meanwhile, the interface 130 includes an analog interface 131 and a digital interface 133. An analog signal such as audio data decoded by the MPEG decoder 115 is transferred to the video display device through the analog interface 131. The digital interface 133 can be realized as an interface such as a DVI or HDMI interface. Thus, digital data reproduced by the data reproducing module 110 can be directly transferred as a digital signal without being separately transformed into an analog signal.

Meanwhile, the external input signal received by the external input receiving unit 140 is transformed into a certain type of signal at the external signal processing unit 150. The external signal processing unit 150 includes a scaler 151, an analog to digital (A/D) converter 153, and a broadcasting format transforming unit 155. The control unit 160 controls at least one among the scaler 151, the A/D converter 153, and the broadcasting format transforming unit 155 so as to conduct a process of signal transformation based on to a user's selection.

First, the scaler 151 serves to transform resolution of an external input signal according to a user's selection. In other words, when a low resolution external input signal is received by the external input receiving unit 140, if a user selects a high resolution output, the external input signal is transformed into a high resolution signal with a pixel complement.

Meanwhile, the A/D converter 153 serves to convert the analog signal to a digital signal when the analog signal is inputted from the external electronic device. Thus, the external input signal can be transferred through the digital interface 133.

Next, the broadcasting format transforming unit 155 serves to transform a broadcasting format of the external input signal based on a user's selection. The broadcasting formats of various countries are different and include the National Television System Committee (NTSC) system, the Phase Alternation Line (PAL) system and the Sequential Couleur Avec Memoire (SECAM) system. Specifically, the NTSC system has 525 scanning lines, 30 frames per second of image transmission, and a 60 Hz field frequency, whereas the PAL system has 625 scanning lines, 25 frames per second of image transmission, and a 50 Hz field frequency. If a PAL system external input signal is received where NTSC is adopted as a broadcasting format, the broadcasting format transforming unit 155 transforms the external input signal into the NTSC broadcasting format by decreasing the scanning lines and increasing image transmission.

The key input receiving unit 170 serves to receive a user selection signal. That is, a user can manipulate buttons provided on a device body or a remote controller to select a transformation state of an external input signal. Also, the key input receiving unit 170 receives a selection signal for selecting any one among data reproduced from the data reproducing module 110 and the transformed external input signal, to output the selected one to the video display device.

Figure 4:
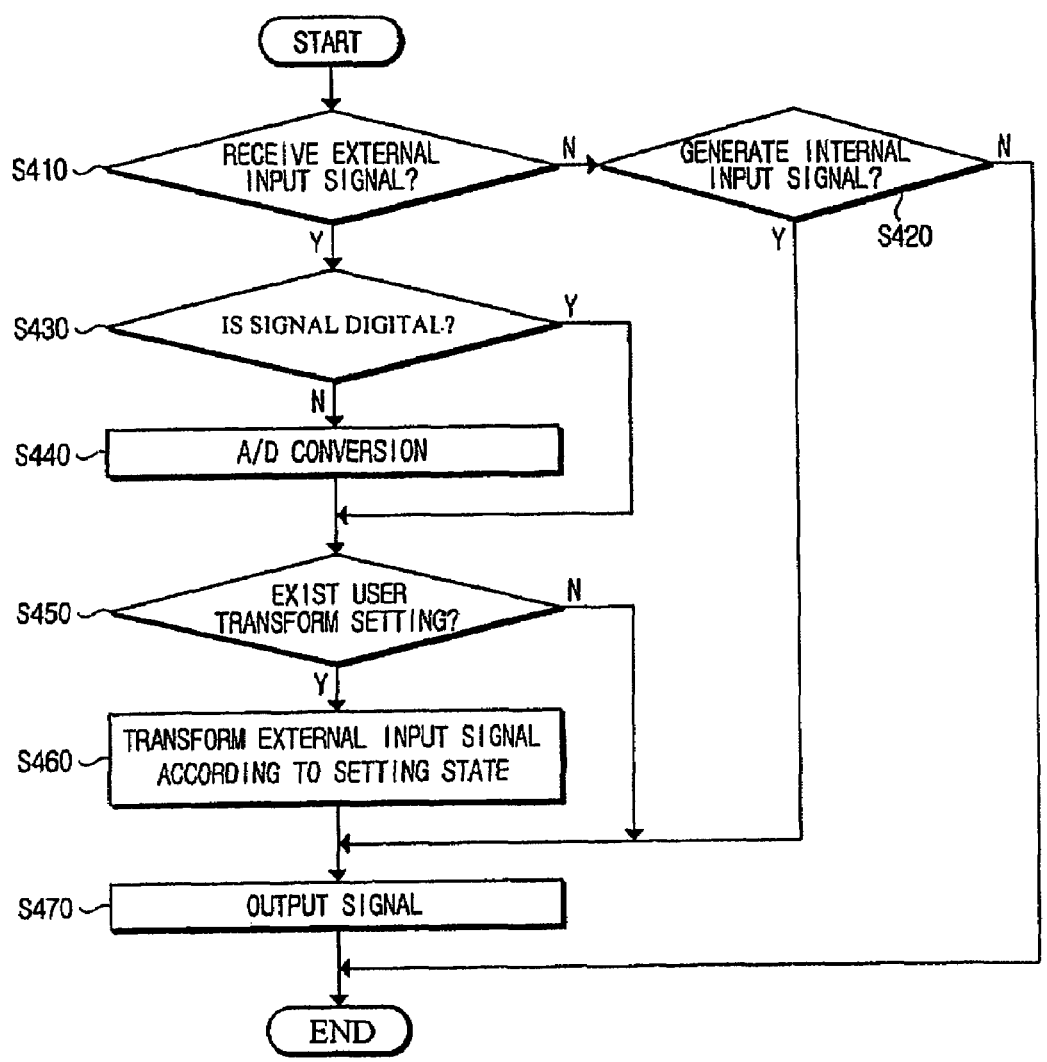
FIG. 4 is a flow chart illustrating a method for data transfer in a DVD reproducing device according to an embodiment of the present invention.

FIG. 4 is a flow chart illustrating a method for data transfer in a DVD reproducing device according to an embodiment of the present invention. Referring to FIG. 4, the control unit 160 checks whether an external input signal is received from the external electronic device (S410). If not, the controller checks whether the internal input signal, i.e., data reproduced from a DVD, is generated (S420).

If an external input signal is received, it is checked whether the received external input signal is analog or digital signal (S430). If an analog signal is received, the analog signal is converted to a digital signal (S440).

Next, it is checked whether a user's setting for transforming of an external input signal exists (S450). If the user's setting for transforming into a certain state exists, an external input signal is transformed corresponding to the user's setting (S460). That is, processing may be conducted such that resolution is changed by the control of the scaler 151, or the broadcasting format is changed by the control of the broadcasting format transforming unit 155.

As a result, the transformed external input signal is outputted to the external video display device (S470). Herein, in order to transfer data converted to a digital signal, an interface such as a DVI or HDMI interface can be used. Meanwhile, if an external input signal is received while the DVD player is operating, a user selectively outputs DVD reproduced data and the external input signal to the video display device.

Accordingly, a user can look and listen to a video signal such as digital photo or a moving picture inputted from the external electronic device, with little noise and a high resolution image.

As described before, according to the present invention, the DVD reproducing device transforms an external signal inputted from the external electronic device into an optimal form so as to be displayed through the video display device, thus to provide it to the video display device. In other words, a digital or analog signal inputted from the external device is processed with decoding, A/D conversion, broadcasting format transformation, resolution change and the like thus to be provided to the video display device, so that little noise and a high resolution image can be outputted. As a result, an external electronic device and a video display device can be more effectively used.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A data reproducing apparatus capable of being connected with an external electronic device, the data reproducing apparatus comprising:
   an external input receiving unit to receive an external input signal of an analog or digital type from the external electronic device;
   a key input receiving unit to receive a user selection signal for selecting whether the external input signal is transformed;
   an external signal processing unit to transform the external input signal into a predetermined form based on the user selection signal; and
   a control unit to control the external signal processing unit such that when the external input signal is received through the external input receiving unit, the received signal is transformed into a predetermined signal form selected by the user selection signal
   wherein the external signal processing unit comprises an A/D converter to convert an analog signal received in the external input receiving unit into a digital signal;
   a scaler to transform a resolution of the external input signal; and
   a broadcasting format transforming unit to transform a signal format of the external input signal, and
   wherein the control unit controls at least one of the A/D converter, the scaler and the broadcasting format transforming unit so as to transform the external input signal in response to the user selection signal.

2. The data reproducing apparatus as claimed in claim 1, further comprising:
   a data reproducing module to reproduce data recorded in a recording medium; and
   a signal output unit selectively outputs any one of an external input signal which is selected by the selection signal transformed at the external signal processing unit and data reproduced at the data reproducing module.

3. The data reproducing apparatus as claimed in claim 2, further comprising:
   an analog interface to transfer an analog signal outputted from the signal output unit to an external video display device; and
   a digital interface to transfer a digital signal outputted from the signal output unit to an external video display device.

4. The data reproducing apparatus as claimed in claim 1, wherein the data reproducing apparatus is a Digital Versatile Disc Player (DVDP).

5. The data reproducing apparatus as claimed in claim 1, wherein the data reproducing apparatus is an MP3 player.

6. The data reproducing apparatus as claimed in claim 1, wherein the predetermined format is designated by a user.

7. The data reproducing apparatus as claimed in claim 1, further comprises
   a signal output unit to output the external input signal transformed based on the user selection signal at the external signal processing unit.

8. A method for transferring data to an external video display device in a data reproducing apparatus, comprising:
   receiving an external input signal of an analog or digital type from the external electronic device;
   receiving a user selection signal for selecting whether the external input signal of an analog or digital type is to be transformed;
   transforming the external input signal of an analog or digital type into a signal form selected by the user selection signal;

transforming a resolution of the external input signal according to a selected state of the user selection signal:

transforming a signal format of the external input signal according to a selected state of the user selection signal according to a selected state of the user selection signal; and transferring a digital signal to the external video display device using a High Definition Multimedia Interface (HDMI).

9. The method for transferring data as claimed in claim 8, further comprising reproducing data recorded on a recording medium; and selectively transferring one of the data reproduced from the recording medium and the transformed external input signal to the external video display device.

10. The method for transferring data as claimed in claim 8, further comprising transferring the transformed external input signal to the external video display device.

11. The method for transferring data as claimed in claim 8, wherein the transferring the transformed external input signal further comprises transferring an analog signal to the external video display device using an analog interface.

* * * * *

UNITED STATES PATENT AND TRADEMARK OFFICE
CERTIFICATE OF CORRECTION

PATENT NO. : 7,490,181 B2  
APPLICATION NO. : 11/156666  
DATED : February 10, 2009  
INVENTOR(S) : Sung-bo Oh Page 1 of 1

It is certified that error appears in the above-identified patent and that said Letters Patent is hereby corrected as shown below:

Column 6, Line 35, after "the" insert --user--.

Column 7, Line 2, change "signal:" to --signal;--.

Signed and Sealed this

Twenty-first Day of April, 2009

JOHN DOLL  
*Acting Director of the United States Patent and Trademark Office*